(12) United States Patent
Trieloff et al.

(10) Patent No.: US 8,756,211 B2
(45) Date of Patent: Jun. 17, 2014

(54) ELECTRONIC CONTENT ANALYTICS

(75) Inventors: Lars Trieloff, Potsdam (DE); Marius Zaharia, Vienna (AT); Stefan Popescu, Bucharest (RO); Roland Schär, Zofingen (CH); Stelian Crisan, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/557,484

(22) Filed: Jul. 25, 2012

(65) Prior Publication Data
US 2014/0032577 A1    Jan. 30, 2014

(51) Int. Cl.
*G06F 17/30* (2006.01)

(52) U.S. Cl.
CPC .................................... *G06F 17/30* (2013.01)
USPC ........... 707/706; 707/713; 707/722; 707/736; 707/758; 707/781

(58) Field of Classification Search
CPC ...................................................... G06F 17/30
USPC .................................................. 707/600–899
See application file for complete search history.

(56) References Cited

U.S. PATENT DOCUMENTS

2012/0101981 A1*   4/2012   Arms et al. ................... 707/608

* cited by examiner

*Primary Examiner* — Isaac M Woo
(74) *Attorney, Agent, or Firm* — Kilpatrick Townsend & Stockton LLP

(57) ABSTRACT

One exemplary embodiment involves displaying, by a device comprising a processor, indications of which events or properties of a component are exposed for analytics, wherein the component comprises a template for instances of the component for use in electronic content. The exemplary embodiment further involves determining, by the device, a mapping based on selection of events or properties of the component to map to corresponding data elements to be tracked by an analytics service. The exemplary embodiment further involves providing, by the device, electronic content comprising at least one instance of the component, the electronic content configured to send information about the data elements to the analytics service based on the mapping during use of the electronic content.

19 Claims, 7 Drawing Sheets

ELECTRONIC CONTENT ANALYTICS

FIELD

This disclosure relates generally to computer software and more particularly relates to the creation, modification, use, and distribution of electronic content.

BACKGROUND

In order to operate commercial websites successfully, it is desirable to measure and track the ways visitors interact with the website, so that metrics such as usability, effectiveness and conversion rate of the website can be analyzed. Such analytic information can be used in order to take informed actions that change the website's content, structure, design and functionality to support the website operator's business goals. For this process of repeated measurement and improvement two different categories of software are typically employed. The content, design and functionality of the website is provided by a web content management system that stores abstract definitions of the website and its meta data and renders them to visitors of the website using a system that determines how the content should be rendered. Modern content management systems use a component approach that allows for variable and flexible templates to reduce development costs.

Measurement and analytics of websites is performed by a second category of software, web analytics systems, that run independently of the content management system. These systems are optimized for collecting selected data about the website's pages, the visitor and the visitor's interaction with the website. Such systems can aggregate the collected data and allow an operator of the web analytics system (i.e., a web analyst) to identify where the website is performing as expected and where it is not performing as expected.

Websites can provide a multitude of rich interactions and there is a great amount of data that could potentially be collected and analyzed. Extracting such information has generally required a significant amount of manual and often repetitive effort, for example, requiring a process called tagging in which the website's Hyper Text Markup Language (HTML) code will be instrumented to extract the data that should be passed to the web analytics system. This process is typically achieved in content management systems by either manually instrumenting the HTML code directly or by augmenting the templates that will generate the instrumented HTML code. Such tagging requires the collaboration between a web analyst that defines what needs to be tracked in what way and a web developer, who is capable of modifying the templates or the generated HTML code so that the website is instrumented correctly. Since large websites typically use dozens of templates, the process is costly and error-prone, which means less accurate tracking and wrongful analysis. Complex websites consist of thousands or hundreds of thousands of webpages that all need to be instrumented individually to get a complete representation of visitor interaction. Large companies are typically running tens to hundreds of websites that are implemented by different web developers, sometimes working for external agencies or system integrators, which makes communication even more complicated. Existing systems generally fail to ensure consistency and comparability in measuring website performance in these and other environments.

SUMMARY

One exemplary embodiment involves displaying, by a device comprising a processor, indications of which events or properties of a component are exposed for analytics, wherein the component comprises a template for instances of the component for use in electronic content. The exemplary embodiment further involves determining, by the device, a mapping based a on selection of events or properties of the component to map to corresponding data elements to be tracked by an analytics service. The exemplary embodiment further involves providing, by the device, electronic content comprising at least one instance of the component, the electronic content configured to send information about the data elements to the analytics service based on the mapping during use of the electronic content.

These illustrative features are mentioned not to limit or define the disclosure, but to provide examples to aid understanding thereof Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed. Description is read with reference to the accompanying drawings, where.

DETAILED DESCRIPTION

Figure 1:
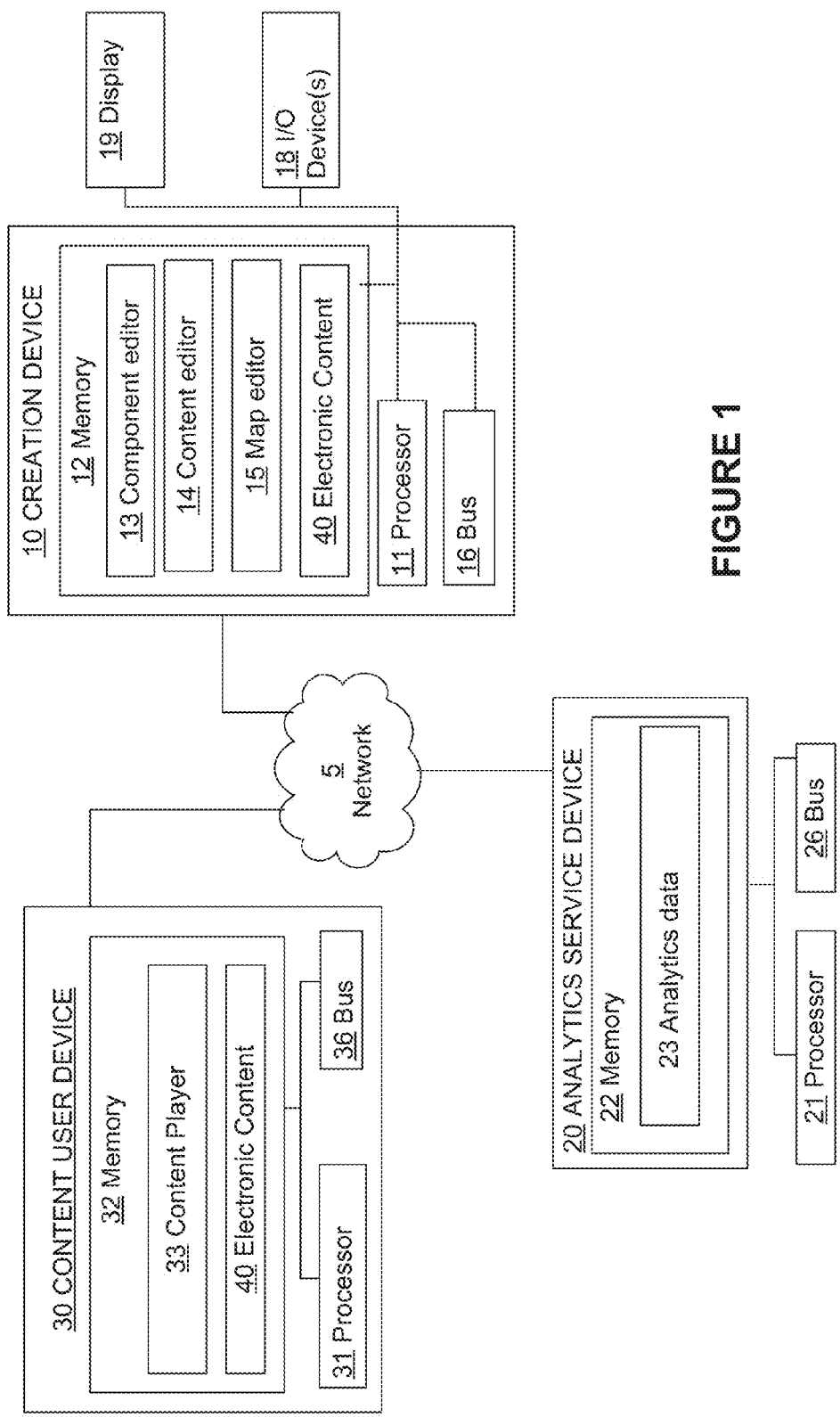
FIG. 1 is a block diagram depicting exemplary computing devices in an exemplary computing environment for implementing certain embodiments.

Computer-implemented systems and methods for facilitating analytics of websites and other electronic content are disclosed. Such systems and methods may facilitate instrumenting a component used in electronic content such that instances of the component used in electronic content expose analytics information in a consistent manner. Embodiments disclosed herein facilitate instrumentation of components independently of mapping the details of a particular analytics service that will receive the analytics information.

A "component" is a template instantiated as one or more instances in electronic content, each instance of the component having common aspects derived from the template. Examples of components include, but are not limited to, a breadcrumbs bar, a download link, an image, a video player, and a search box. Most (if not all) visual elements in a webpage and other electronic content can be implemented as instances of a component.

In one embodiment, instead of augmenting each element used in electronic content with analytics-instrumenting code individually, web developers and other users can instrument analytics at the component level. All instances of the component can have the analytics functionality from the component's definition. This can simplify development and ensure consistent tracking of similar analytics, e.g., so that all instances of a search component within a website or specified portion thereof will have analytics tracked in the same manner.

Components can be generically augmented with analytics features to expose information about properties and events in a way that can be used directly or indirectly by multiple, different analytic services. The functionality that provides analytic service specific functions can be provided separately from the functionality that exposes the information generically. For example, in one embodiment, the generic analytics functions are added to the components and another collection element is created to receive the information, provide any necessary translations or conversions, and send or provide for sending the desired information to an analytic service. Such a collection element may itself be implemented as a component that is included in electronic content for this purpose.

The analytic service specific functionality added to electronic content can be created based on a specified mapping. To facilitate and simplify creation of such analytic service specific functionality, a development interface and related feature can be provided. An analyst or other user can use such an interface to create a mapping of analytic exposed data (e.g., attributes and events of a component) of electronic content to variables or other data elements collected or tracked by an analytics service. In one embodiment, a graphical user interface displays indications of which events or properties of a component are exposed for analytics, receives selections mapping events or properties to data elements, and provides a mapping that facilitates sending of appropriate information to the analytics service during use of the analytics service. In one exemplary embodiment, sending this information can be facilitated by augmenting the electronic content with elements to collect generic analytic information from component instances, convert or translate at least some of the collected information as may be appropriate according to the mapping, and send the translated or converted information to an appropriate and usually remote analytics service.

As one example, multiple instances of a search component may be used on a set of webpages. An analyst can use a graphical user interface to map a property (e.g., a search term, number of results, etc.) or event (e.g., searches) to a data element of an analytics service. When the webpages are deployed and used, the webpages include code that causes the appropriate information (e.g., a data element corresponding to a search term used in a search in the instance of the component on any of the webpages) to be sent to a server or other device of the analytics server.

Embodiments disclosed herein provide various advantages over existing systems. Such benefits, as examples, may include providing efficient and easy-to-use mechanisms that allow instrumenting a website so that visitor interaction with the website can be tracked consistently. Analytics instrumentation can be used in a consistent and efficient manner across one or multiple websites, rich interact applications, or any other electronic content, on that conflicting or incomplete instrumentation can be avoided. The time needed to track complex websites may also be reduced significantly and the task of instrumenting websites may be split amongst users in a collaborative way. In embodiments involving a graphical user interface, because creating a mapping of events or properties to analytics service data elements can be done mostly visually, the level of technical expertise needed, and the reliance on generally overloaded software engineers in large companies, may be greatly reduced. Also, the process of extracting instrumentation data from a website, which is made independent of external system technologies, can be separated from the process of packaging and sending that data to an external data collection and processing system. This enables the instrumentation data to be easily reused with other systems for varying purposes (web analytics, A/B or multivariate testing, marketing campaigns, etc.)

Embodiments disclosed herein facilitate analytics-system-independent instrumentation. Instead of applying external system instrumentation directly to a component or instance of a component, instrumentation of a component may configure instances of the component to generically send extracted data to a set of data stores independent from any external data collection or other analytics system. A mapping of extracted data to external system data requirements can be separately created and used to link the extracted data for analytics. This separation of instrumenting a component from defining the sending of data to the external analytics service allows the component to be instrumented without having to assume knowledge about how the extracted data will be used in the further process.

Embodiments disclosed herein also allow instrumentation of components with information that facilitates subsequent mapping of exposed properties and events to the data elements collected or tracked by the external analytics service. Instrumented components, for example, can be annotated with analytics-facilitating information in addition to being instrumented to expose the information.

Embodiments disclosed herein facilitate graphical configuration of instrumentation mappings. A graphical user interface can be presented to allow a web analyst or other user to inspect what analytic annotations the websites components are providing (through the metadata provided in the component) and to also see what kind of data is accepted by the web analytics system. Through such a graphical interface, the web analyst or other user can select the components that should be tracked and select for each trackable interaction and interaction property how it should be tracked in the web analytics system. This mapping associates types of data collected through the system's own instrumentation mechanisms (and stored internally) to types of data that the external data collection system accepts. More specifically, it associates an event or property of the websites (or other electronic content) with data items (corresponding events or properties) from an analytics system.

These illustrative examples are given to introduce the reader to the general subject matter discussed here and are not intended to limit the scope of the disclosed concepts. The following sections describe various additional embodiments and examples with reference to the drawings in which like numerals indicate like elements.

Referring now to the drawings, FIG. 1 is a block diagram depicting exemplary computing devices in an exemplary computing environment for implementing certain embodiments. Applications and other electronic content execute or are otherwise used on the exemplary computer devices 10, 20, 30 and are shown as functional components or modules. As is known to one of skill in the art, such applications and content may be resident in any suitable computer-readable medium and execute on any suitable processor. As shown the client devices 10, 20, 30 respectively comprise a computer-readable medium such as a random access memory (RAM) 12, 22, 44 coupled to a processor 11, 21, 31 that executes computer-executable program instructions and/or accesses information stored in the memory 12, 22, 24. Such processors 11, 21, 31 may each comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The devices 10, 20, 30 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 16, 26, 36, is included in the device 10. Device 10 could be a personal computing device, a mobile device, or any other type of electronic devices appropriate for providing one or more of the features described herein.

Creation device 10 in FIG. 1 comprises a component editor 13, a content editor 14, and a map editor 15 stored in memory 12. These editors 13, 14, 15 could be part of a single application spread out into individual applications. In alternative embodiments, one or more of editors 13, 14, 15 is separated onto a separate device. In yet other alternative embodiments, multiple users are able to access one or more of editors 13, 14, 15 on one or more computing devices to collaboratively create and edit analytics-enabled electronic content.

Component editor 13, for example, could be used by a software engineer to create and edit a component. Creating or editing a component could involve the software engineer adding code and/or annotations to expose properties and events of instances of the component for analytics. As a specific example, the software engineer may add one or more declarative statements calling analytics-enabling functions and providing parameters that specify what properties and events are exposed for analytics. Additionally or alternatively, the software engineer may add annotations in metadata of the component identifying the properties and events.

Content editor 14, for example, could be used by a webpage developer to create one or more webpages using one or more components created on component editor 13. The webpage developer may, in one embodiment, include a specific analytics component for receiving and consolidating analytics messages from instances of analytics-enabled components. In certain embodiments, using analytics-enabled components (and in one embodiment also including a consolidating component) is all the webpage developer needs to do in creating the webpage content since another user can provide a mapping that is added to or used by the electronic content to facilitate a link between instances of components that generically provide analytic information and an analytic service collecting device, such as device 20.

The map editor 15 can be used, for example, by an analyst who may have limited technical sophistication with respect to understanding webpage creation code, etc. The analyst may use a graphical user interface provided by the map editor 15 to identify which of the exposed properties and events from each of the components will be associated with corresponding data elements of an analytics service. Creating such a mapping will result in tracking of the specified properties and events for all (or in one embodiment selected instances) of the component. In circumstances where the mapping applies to all instances, use of the mapping ensures consistent use, application, and management of the analytics.

Figure 2:
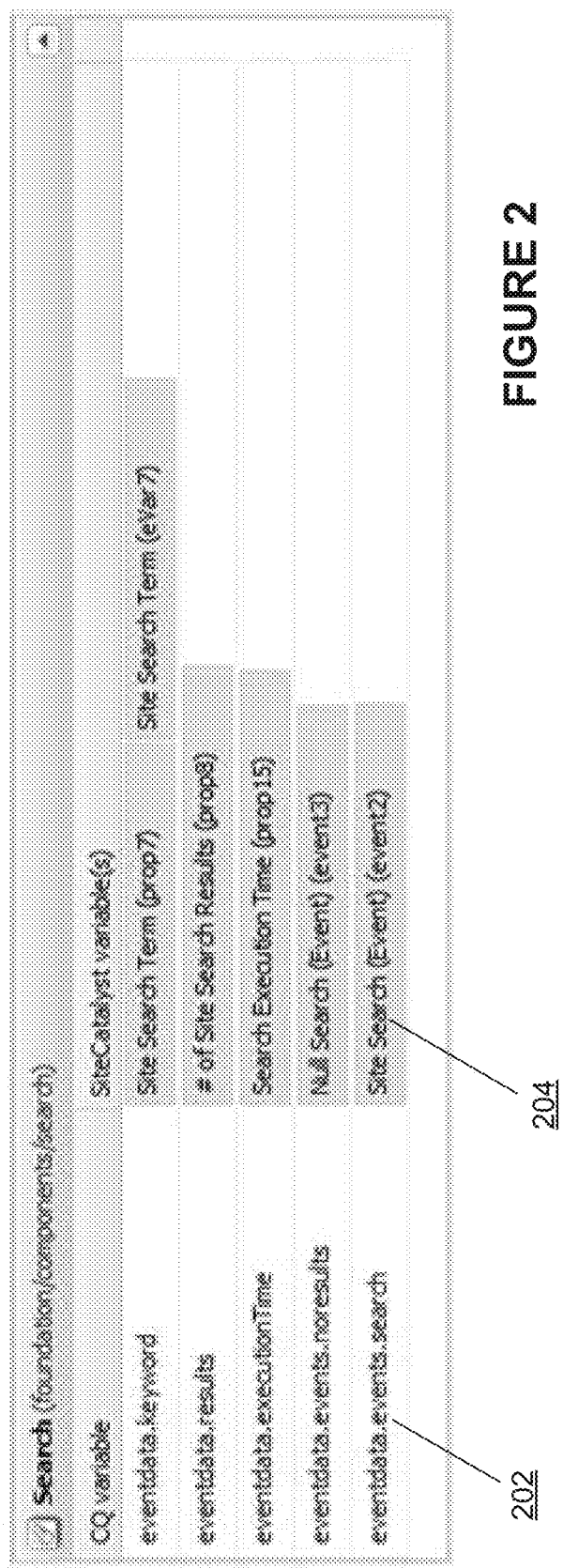
FIG. 2 illustrates an exemplary user interface display of a mapping.

FIG. 2 illustrates an exemplary user interface display of a mapping. In this example, component events/properties 202 of a search component are mapped to data elements 204 of an external analytics service. In this example, "eventdata.keyword" is mapped to "Site Search Term (prop7)" and "Site Search Term (eVar7)," "eventdata.results" is mapped to "# of Site Search Results (prop8)," "eventdata.executionTime" is mapped to "Search Execution Time (prop15)," "eventdata.events.noresults" is mapped to Null Search (Event) (event3)," and "eventdata.events.search" is mapped to "Site Search (Event) (event2)."

Figure 3:
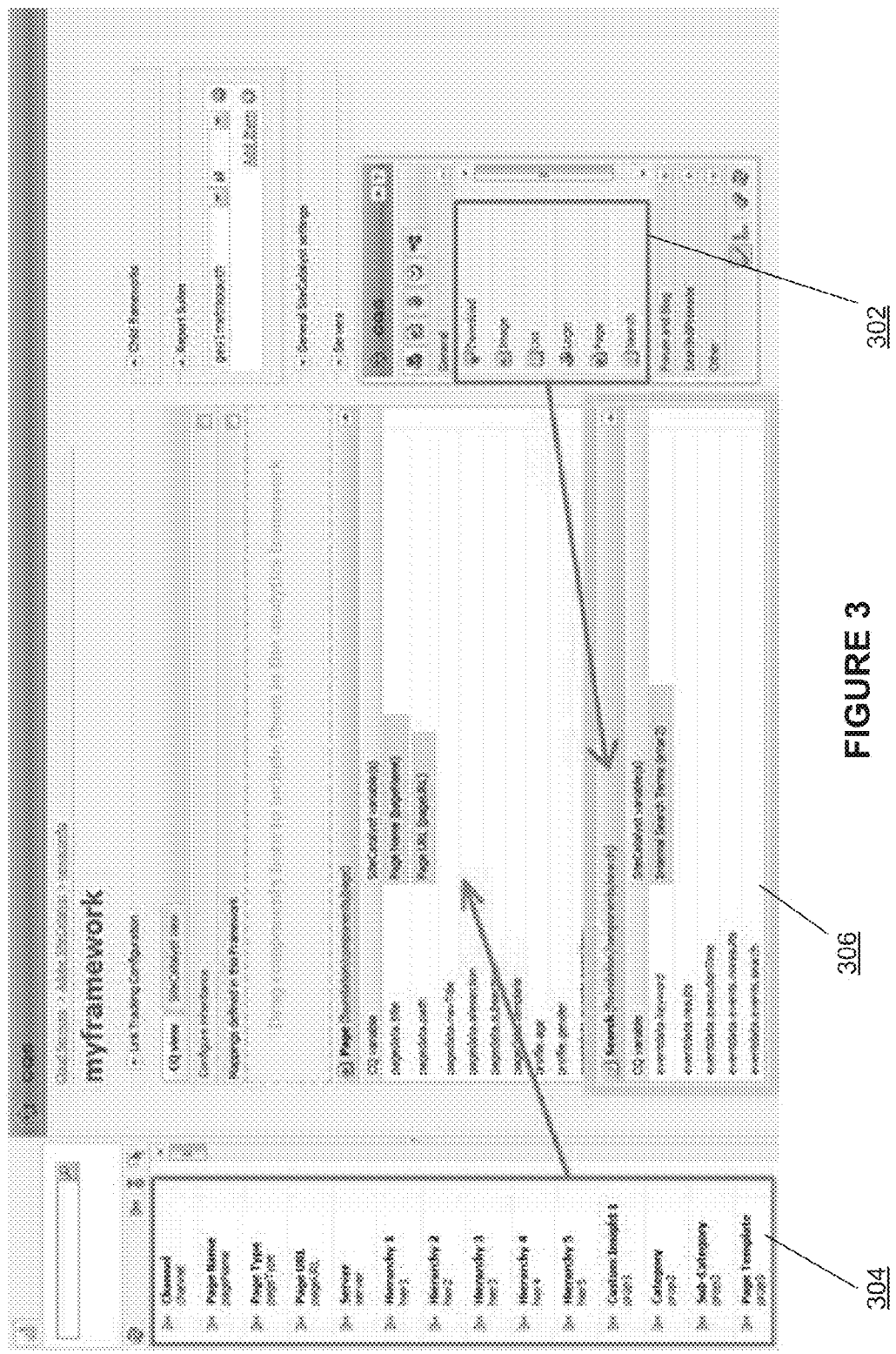
FIG. 3 illustrates an exemplary user interface display for creating a mapping.

FIG. 3 illustrates an exemplary user interface display for creating a mapping. This exemplary interface allows a user to drag and drop from area 302 listing of components to select a component to add mapping details and drag and drop an analytic service's data elements from area 304 to area 306 to create an association between the dragged data element and the adjacent property or event of the component. The mapping in area 306 allows the analyst or other user to easily comprehend, create, and edit the relationships.

Map editor 15 call provides inheritance between mappings. Different mapping configurations can establish an inheritance relationship, which allows for easier management of multiple mapping configurations that share common aspects. Each mapping configuration can have multiple sub-configurations. For each sub-configuration, the web analyst or other user can decide to simply copy (inherit) the super-configuration's component mappings or to override it and provide its own component-specific mappings. Additionally, for sub-configurations it is possible to introduce additional component-specific mappings. Changing the mapping of a component's events and properties will affect all sub-configurations unless the component mapping has not been overridden. This makes it possible to keep a great number of configurations consistent with each other, while allowing some degree of flexibility through customization.

Returning to FIG. 1, the mapping produced by the map editor can be used to automatically add analytics specifics to electronic content. For example, if a webpage developer has created electronic content 20 on content editor 14, a mapping produced on map editor 15 may be used to add to or otherwise alter the electronic content to implement the analytic specifics (e.g., for a specific analytics service) according to the specified mapping.

A webpage developer may, in one embodiment, include a specific analytics component for receiving and consolidating analytics messages from instances of analytics-enabled components. For example, in order to apply a mapping configuration to instrument a webpage, the actual interpretation of the mapping, which may insert a translation layer between a component-specific instrumentation and the web analytics system-specific instrumentation code to be embedded in the site, can be centralized in a single component. Instead of configuring instrumentation for each template or page individually, the web analyst can configure the centralized analytics component once for each website that is using a distinct mapping configuration. The centralized analytics component will then be interpreted for each page in the site to apply an associated mapping.

Figure 4:
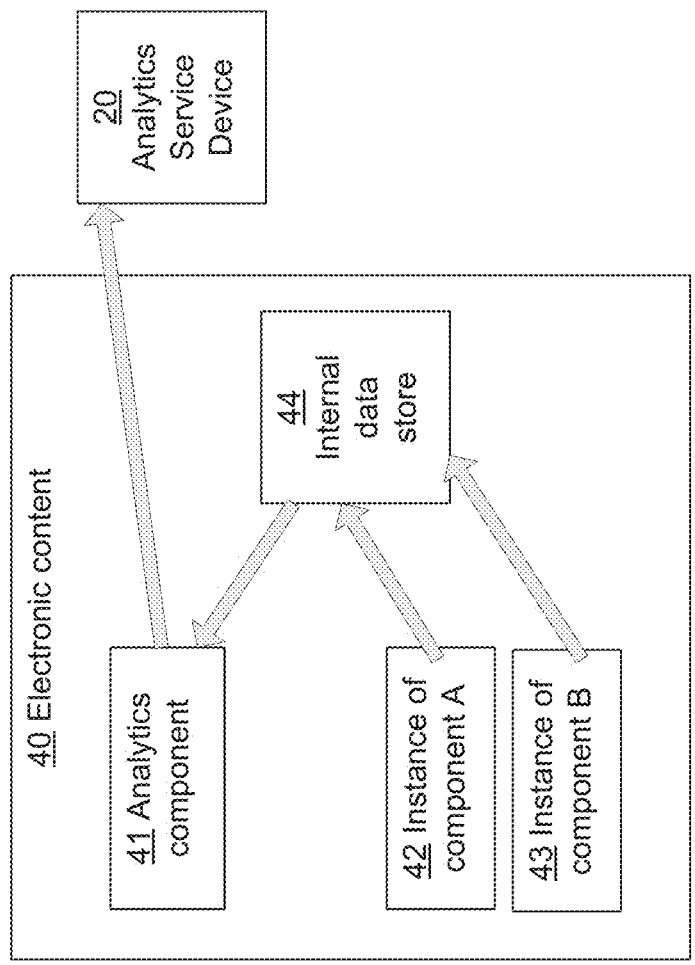
FIG. 4 illustrates an exemplary flow of analytics tracking using a consolidating analytics component.

FIG. 4 illustrates an exemplary flow of analytics tracking using a consolidating analytics component 44. In this example, electronic content 40 comprises an instance of component A 42 and an instance of component B 43 that send analytic information (e.g., about properties and events) to internal data store 44 for use by consolidating analytics component 44. Consolidating analytics component 44 makes the information available for sending externally, for example, to an analytics service device.

Figure 5:
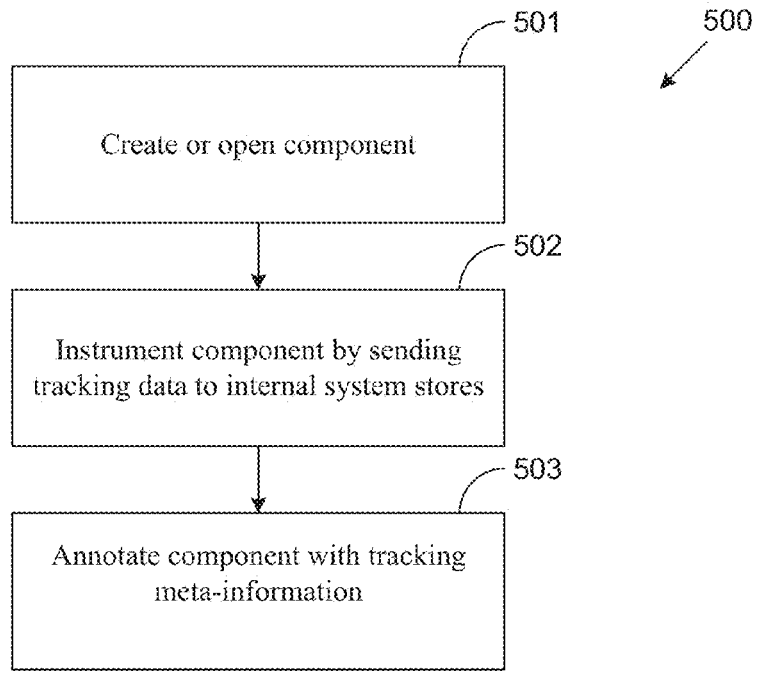
FIG. 5 is a flow chart illustrating an exemplary component development process.

FIG. 5 illustrates an exemplary component development process 500. Component development process 500 may be conducted, for example, by a developer or other user using component editor 13 of FIG. 1 or any other suitable device. The exemplary component development process 500 involves creating or opening the component, as shown in block 501, instrumenting the component by sending tracking data to an internal system stores, as shown in block 502, and annotating the component with tracking meta-information, as shown in block 503. Instrumenting the component may involve examining data that the component stores or processes and identifying the data that may be of interest for analysis/processing (tracking data) by other (sub)systems, whether internal or external, such as an analytics service. Instrumenting the component allows the component to expose tracking data for consumption within the system or systems that incorporate the component. Data may be exposed in a uniform way so that any other internal subsystem may readily access it. For example, this may be achieved by sending tracking data to JavaScript key-value stores, grouped under a particular subsystem that resides in a browser and stores data such as browser info, visitor profile, current page data etc.

Figure 6:
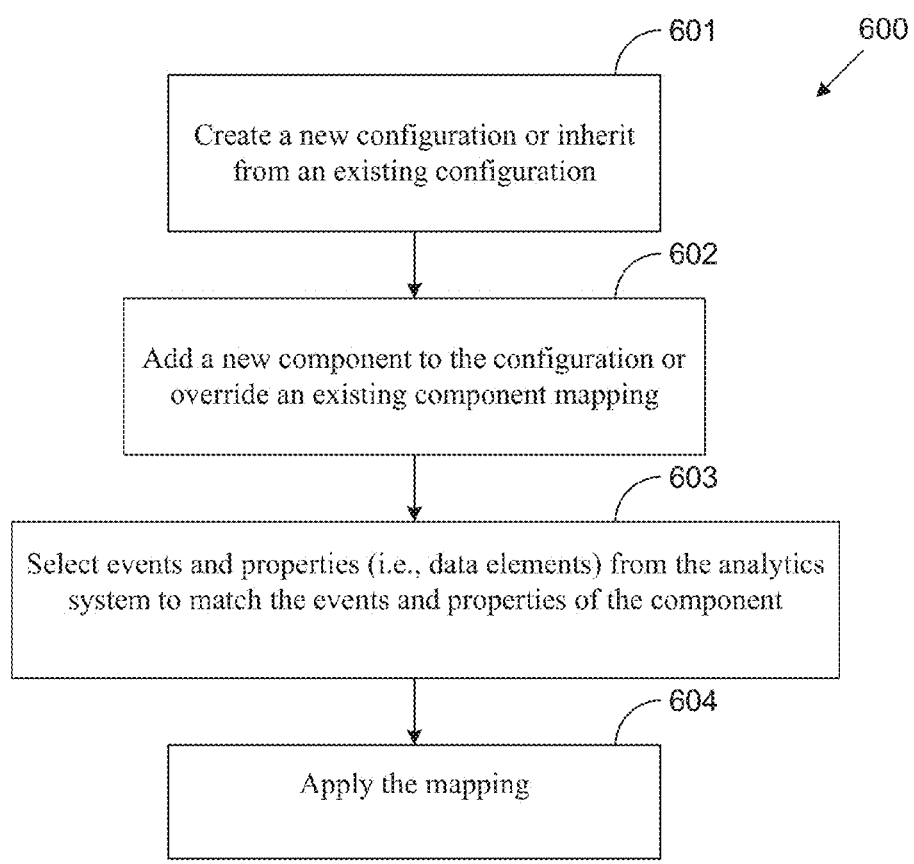
FIG. 6 is a flow chart illustrating an exemplary mapping process.

FIG. 6 illustrates an exemplary mapping process 600. Mapping process 600 may be conducted, for example, by an analyst or other user using map editor 15 of FIG. 1 or any other suitable device. The exemplary mapping process 600 involves creating a new configuration or inheriting from an existing configuration, as shown in block 601, adding a new component to the configuration or overriding an existing component mapping, as shown in block 602, selecting events and properties (i.e., data elements) from the analytics system to match the events and properties provided by the component, as shown in block 603, and applying the mapping as shown in block 604.

Figure 7:
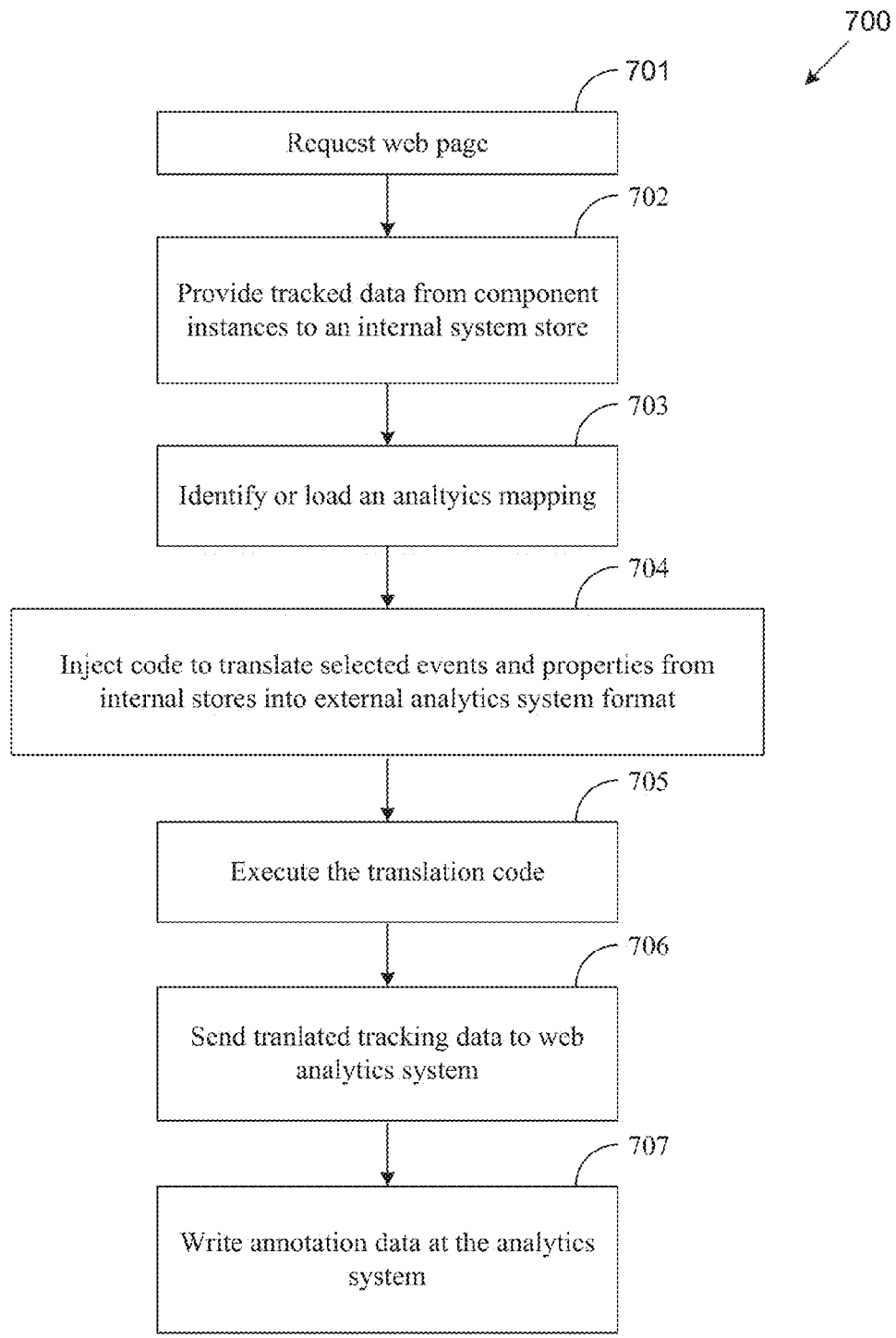
FIG. 7 is a flow chart illustrating an exemplary execution process.

FIG. 7 illustrates an exemplary execution process 700. Execution process 700 may be conducted, for example, by a user using player 33 of content user device 30 of FIG. 1 or any other suitable device to play or use content 40. The exemplary execution process 700 involves requesting a webpage, as shown in block 701, providing tracked data from component instances to an internal system store, as shown in block 702, identifying or loading an analtyics mapping (perhaps based on a page template including an analytics component), as shown in block 703, injecting code to translate selected events and properties from internal stores into external analytics system format, as shown in block 704, executing the translation code, as shown in block 705, and sending translated tracking data to a web analytics system, as shown in block 706, and writing annotation data at the analytics system, as shown in block 707. The mapping identified or loaded in block 703 may be identified by an analytics component searching for a mapping on the current webpage, and if none is available, loading configuration from a parent webpage or nearest ancestor webpage. The analytics system may store the received data as analytics data 23 (FIG. 1) and use it, as examples, to write annotation data, and generate the appropriate reports, or otherwise help inform business or other electronic content management decisions. Providing tracked data from component instances to an internal system store as shown in block 702 can involve broadcasting the information to expose the information at a script layer, e.g., a java script layer.

Figure 8:
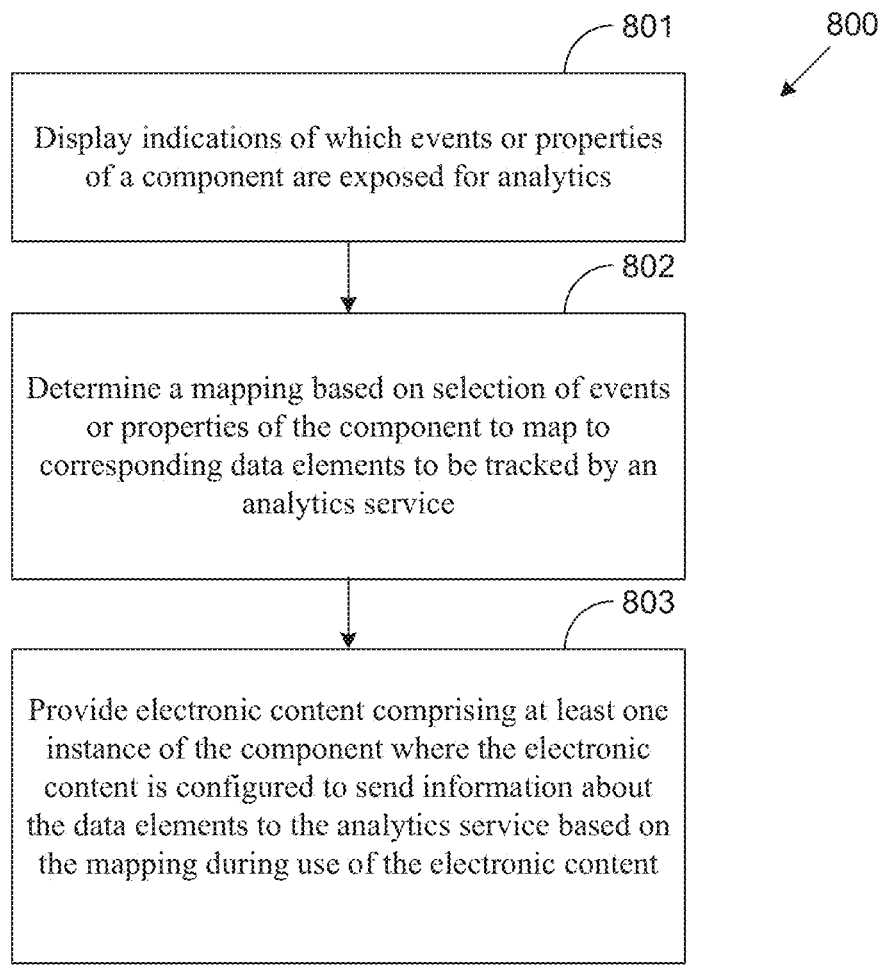
FIG. 8 is a flow chart illustrating an exemplary method 800 of providing analytics-enabled electronic content.

FIG. 8 is a flow chart illustrating an exemplary method 800 of providing analytics-enabled electronic content. Such an exemplary method 300 may be performed on a variety of computer devices including, but not limited to device 10 of FIG. 1. For purposes of illustration not limitation, the features of exemplary method 800 are described with reference to elements of FIG. 1.

The exemplary method 800 involves displaying indications of which events or properties of a component are exposed for analytics, as shown in block 801. The component comprises a template for instances of the component for use in electronic content that is being created or that was previously created. Display of these events or properties may be based on the component comprising code or metadata or both identifying the exposed events or properties of the component. In one embodiment, the component comprises at least one declarative statement identifying the exposed events or properties of the component.

The exemplary method 800 further involves determining a mapping based on a selection of events or properties of the component to map to corresponding data elements to be tracked by an analytics service, as shown in block 802. Selection of the mapped events or properties may be non-text input such as mouse-based input identifying an association between each of the mapped events and a corresponding data element of the data elements. In response to such input, one or more declarative statements may be generated, defining the mapping based on the mouse-based or other non-text input identifying the associations. The mapping may apply to both new and existing instances of the component.

The exemplary method 800 further involves providing electronic content comprising at least one instance of the component where the electronic content is configured to send information about the data elements to the analytics service based on the mapping during use of the electronic content, as shown in block 803. The electronic content may be configured to convert, based on the mapping, information about the mapped events or properties to a different format to provide the information about the data elements.

The electronic content may comprise a single instance of a consolidation component configured to receive identifications of occurrences of all events mapped for tracking by the analytics service and to expose all events mapped for tracking by the analytics service by, for example, providing client-side broadcasts to a script layer of the electronic content. The electronic content may comprise a receiver configured to receive the client-side broadcasts, convert the client-side broadcasts to the information about the data element, and send the information about the data elements to a remote server of the analytics service. The webpages may be developed to include receivers that are web analytics features added to the webpages. Such receivers may register themselves with the analytic consolidation component instance to receive particular tracking broadcasts. The analytic consolidation component instance will go over its list of subscribers and forward to appropriate receivers. Individual subscriber receivers can convert/translate and send one or more remote messages. In one embodiment, a single instance of the consolidation component may be configured to maintain, based on the mapping, identities of a plurality of receivers to receive client-side broadcasts regarding the mapped events or properties.

An exemplar workflow in which analytics is enabled for electronic content involves a team attempting to instrument tracking of an image used in a group of webpages of a website. The developer of the image component creates the component and identifies properties to track such as size, name, etc. The developer also uses an Application Programming Interface (API) to reference this information from within the component's code, for example, identifying that the image is 500 pixels wide, its file name etc. As a particular example, the developer may use a programming interface to call a method/ or add an attribute in the source code of the component and/or to add metadata to component to describe what properties/ events can be tracked. An example of changing metadata involves changing a java content repository property. The developer may also add an analytics consolidation component that can be included in each of the webpages to collect tracked data. The developer's efforts may result in a component that always exposes the exposed properties and events allowing another user to set up a mapping that will set up receivers to receive some or all of the always broadcasted information. In other words, in this example, the component instances will always broadcast regardless of whether anything is configured to listen or otherwise receive the broadcasts. After exposing the events and properties of the component, a marketing analyst or other user creates a mapping to provide a framework that specifies which information will actually be tracked, how it will be converted, and to where it will be sent, e.g., to which analytics service. The webpages with the image included are launched and are analytics-enabled because instances of the image in the webpages send the map-identified tracked information to a collector instance that makes the information available to receivers that send the information to the specified (in the mapping) external analytics service. Numerous other permutations and work flows are also possible.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/ or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
    displaying, by a device comprising a processor, indications of which events or properties of a component are exposed for analytics, wherein the component comprises a template for instances of the component for use in electronic content;
    determining, by the device, a mapping based on selection of events or properties of the component to map to corresponding data elements to be tracked by an analytics service; and
    providing, by the device, electronic content comprising at least one instance of the component, the electronic content configured to send information about the data elements to the analytics service based on the mapping during use of the electronic content.

2. The method of claim 1 wherein the electronic content is configured to convert, based on the mapping, information about the mapped events or properties to a different format to provide the information about the data elements.

3. The method of claim 1 wherein the selection of the mapped events or properties is mouse-based input identifying an association between each of the mapped events and a corresponding data element of the data elements.

4. The method of claim 3 further comprising automatically generating at least one declarative statement defining the mapping based on the mouse-based input identifying the associations.

5. The method of claim 1 wherein the electronic content comprises at least one webpage configured to expose the exposed events or properties of the at least one instance of the component.

6. The method of claim 5 wherein the webpage comprises a single instance of a consolidation component configured to receive identifications of occurrences of all events mapped for tracking by the analytics service and to expose all events mapped for tracking by the analytics service by providing client-side broadcasts to a script layer of the electronic content.

7. The method of claim 6 wherein the electronic content comprises a receiver configured to receive the client-side broadcasts, convert the client-side broadcasts to the information about the data element, and send the information about the data elements to a remote server of the analytics service.

8. The method of claim 6 wherein the single instance of the consolidation component is configured to maintain, based on the mapping, identities of a plurality of receivers to receive client-side broadcasts regarding the mapped events or properties.

9. The method of claim 1 wherein the consolidation component comprises code identifying the exposed events or properties of the component.

10. The method of claim 1 wherein the component comprises metadata identifying the exposed events or properties of the component.

11. The method of claim 1 wherein the component comprises at least one declarative statement identifying the exposed events or properties of the component.

12. The method of claim 1 further comprising adding an instance of the component to the electronic content after determining the mapping, wherein analytics defined by the mapping automatically applies to the added instance of the component.

13. The method of claim 1 wherein the analytics defined by the mapping automatically applies to an instance of the component added to the electronic content prior to determining the mapping.

14. The method of claim 1 wherein the electronic content is one or more webpages or one or more rich Internet applications.

15. The method of claim 1, wherein the electronic content is a web page configured to track the selected events or properties of the component by sending the information about the data elements to the analytics service.

16. The method of claim 1, wherein the electronic content comprises a statement specifying tracking of the selected events or properties of the component by sending the information about the data elements to the analytics service.

17. The method of claim 1, wherein the electronic content is a web page defined by declarative code, wherein the declarative code comprises a statement specifying tracking of the selected events or properties of the component by sending the information about the data elements to the analytics service.

18. The method of claim 1, wherein each of multiple instances of the component in the electronic content is tracked in a same manner based on the mapping.

19. A non-transitory computer-readable medium on which is encoded program code, the program code comprising:
- program code for displaying indications of which events or properties of a component are exposed for analytics, wherein the component comprises a template for instances of the component for use in electronic content;
- program code for determining a mapping based on selection of events or properties of the component to map to corresponding data elements to be tracked by an analytics service; and
- program code for providing, by the device, electronic content comprising at least one instance of the component, the electronic content configured to send information about the data elements to the analytics service based on the mapping during use of the electronic content.

* * * * *